(12) United States Patent
Shrinath et al.

(10) Patent No.: US 10,067,985 B2
(45) Date of Patent: Sep. 4, 2018

(54) COMPUTING SYSTEM WITH CROWD-SOURCE MECHANISM AND METHOD OF OPERATION THEREOF

(71) Applicant: Telenav, Inc., Sunnyvale, CA (US)

(72) Inventors: Arjun Shrinath, Sunnyvale, CA (US); Aliasgar Mumtaz Husain, Milpitas, CA (US); Qi Dai, Los Gatos, CA (US); Liang Wang, San Jose, CA (US); Peng Yan, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 429 days.

(21) Appl. No.: 14/639,785

(22) Filed: Mar. 5, 2015

(65) Prior Publication Data
US 2016/0259789 A1  Sep. 8, 2016

(51) Int. Cl.
*G06F 17/00* (2006.01)
*G06F 17/30* (2006.01)

(52) U.S. Cl.
CPC ............................. *G06F 17/3053* (2013.01)

(58) Field of Classification Search
CPC ....... G06F 17/30864; G06F 2221/2141; G06F 17/3053; G06F 21/6218; G06F 17/28
See application file for complete search history.

(56) References Cited

U.S. PATENT DOCUMENTS

| 6,327,590 B1* | 12/2001 | Chidlovskii ...... G06F 17/30867 707/734 |
| 7,856,360 B2 | 12/2010 | Kramer et al. |
| 2006/0041562 A1* | 2/2006 | Paczkowski ...... G06F 17/30884 |
| 2006/0190344 A1* | 8/2006 | Sang ..................... G06Q 30/06 706/50 |
| 2014/0222702 A1* | 8/2014 | Jennings ................ G06Q 50/01 705/319 |

* cited by examiner

*Primary Examiner* — Truong Vo
(74) *Attorney, Agent, or Firm* — Perspectives Law Group, Corp.

(57) ABSTRACT

A method of operation of a computing system includes: receiving a request for representing the request from a user; generating a request profile based on the request for processing the request; determining a matching expert with a control unit for the request based on the request profile and based on member profiles for representing members; and communicating the request for the matching expert.

20 Claims, 6 Drawing Sheets

COMPUTING SYSTEM WITH CROWD-SOURCE MECHANISM AND METHOD OF OPERATION THEREOF

TECHNICAL FIELD

An embodiment of the present invention relates generally to a computing system, and more particularly to a system with a crowd-source mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is leveraging resources of a crowd to address a need. The possible applications for leveraging resources of a crowd to address users' needs have yet been fully utilized.

Thus, a need still remains for a computing system with a crowd-source mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a computing system including: receiving a request for representing the request from a user; generating a request profile based on the request for processing the request; determining a matching expert with a control unit for the request based on the request profile and based on member profiles for representing members; and communicating the request for the matching expert.

An embodiment of the present invention provides a computing system, including: a communication unit configured to communicate a request for representing the request from a user or for a matching expert; a control unit, coupled to the communication unit, configured to: generate a request profile based on the request for processing the request, and determining the matching expert for the request based on the request profile and based on member profiles for representing members, for communicating the request to the matching expert.

An embodiment of the present invention provides a non-transitory computer readable medium including instructions for a computing system, including: receiving a request for representing the request from a user; generating a request profile based on the request for processing the request; determining a matching expert for the request based on the request profile and based on member profiles for representing members; and communicating the request for the matching expert.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
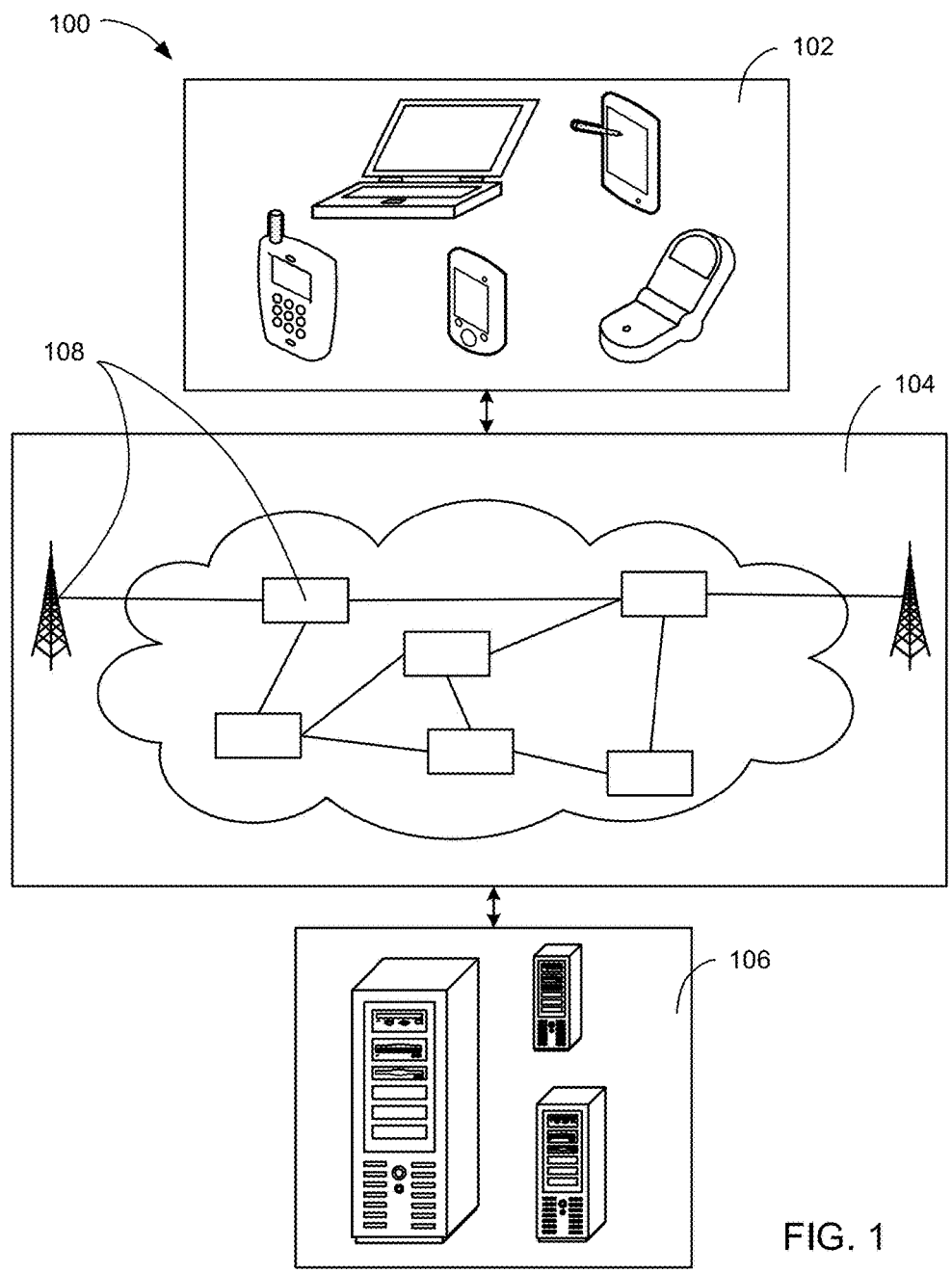
FIG. 1 is a computing system with a crowd-source mechanism in an embodiment of the present invention.

The following embodiments can be for implementing a crowd-sourced interaction between users of a computing system. The computing system can receive a request from a user, and analyze the request to generate a request profile. The computing system can further analyze members to generate a member profile including subject expertise and regional expertise.

The computing system can determine a matching expert for addressing the request from amongst the members based on the member profile and the request profile. The computing system can generate a matching response to the request, interact or communicate with the user or the matching expert regarding the request or the matching response, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a computing system 100 with a crowd-source mechanism in an embodiment of the present invention. The computing system 100, including a navigation system for searching or providing guidance or information associated with geographic locations, can include a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further be separate form or incorporated with a vehicle, such as a car, truck, bus, or train.

For illustrative purposes, the computing system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the network 104, although it is understood that the computing system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
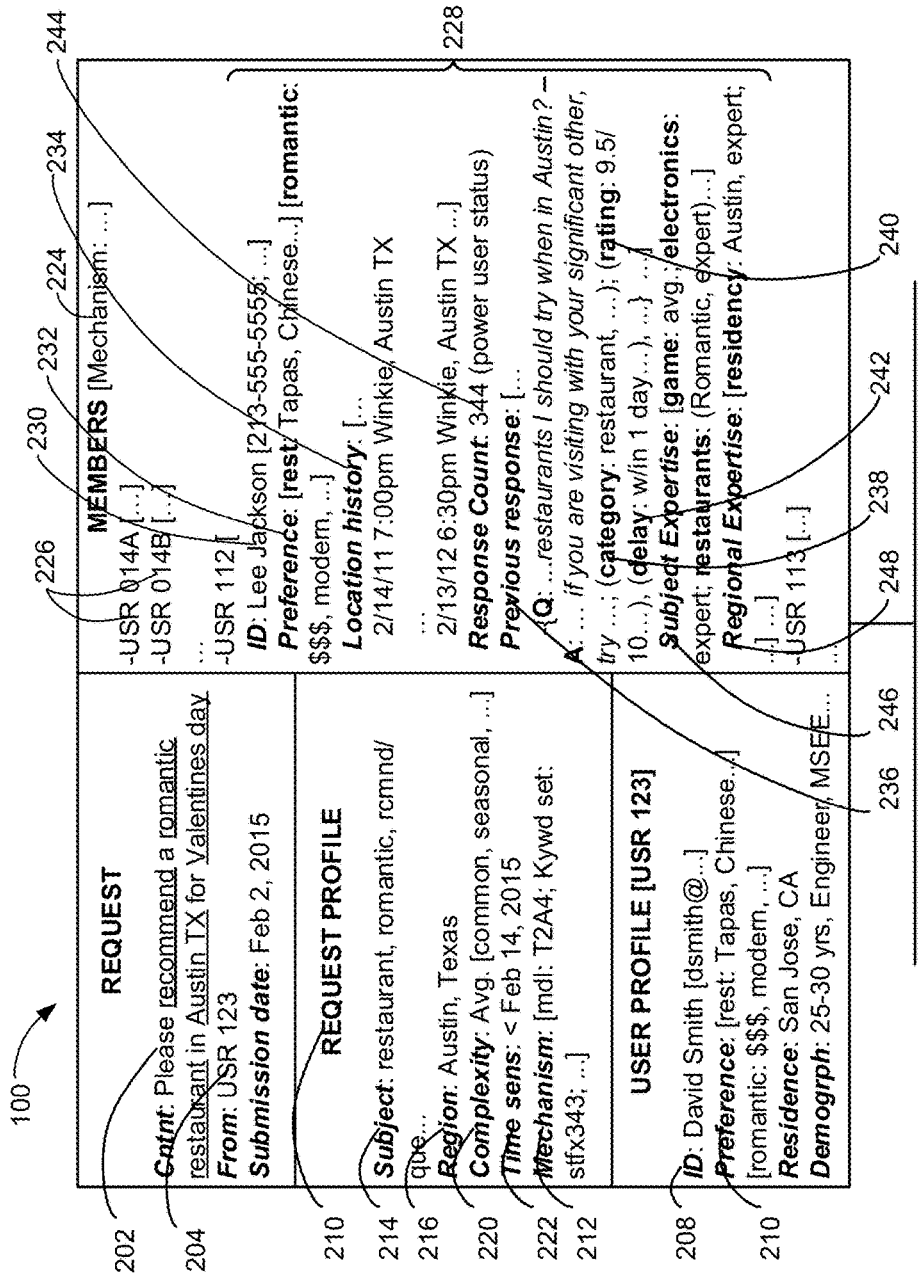
FIG. 2 is an example of a display interface of the computing system.

Referring now to FIG. 2, therein is shown an example of a display interface of the computing system 100. The computing system 100 can analyze a request 202 from a user 204 to provide an appropriate response to the request 202.

The request 202 can include a question requesting information or recommendation. The request 202 can further include a request for performing an action or a task, establishing a goal or an objective, or a combination thereof.

The request 202 can be associated with a map or map data. For example, the request 202 can be regarding a point of interest (POI), a location, an establishment, a service, a geographic location or area, a trait or a characteristic thereof, or a combination thereof.

As a more specific example, the request 202 can further include a question or a request for information or recommendation regarding the POI, the location, the establishment, the service, the geographic location or area, or a combination thereof. Also as a more specific example, the request 202 can be for performing the action or the task, establishing the goal or the objective, or a combination thereof by or relative to the POI, the location, the establishment, the service, the geographic location or area, or a combination thereof.

The user 204 can include a person, an entity, a group, or a combination thereof generating or providing the request 202. The user 204 can further include the person, the entity, the group, or a combination thereof utilizing the computing system 100. The user 204 can include the person, the entity, the group, or a combination thereof interfacing with or through the first device 102 of FIG. 1, the second device 106 of FIG. 1, or a combination thereof.

For illustrative purposes, the user 204 will be described as owning, directly interfacing with, physically interacting with, or a combination thereof with respect to the first device 102. The first device 102 can access or interact with the second device 106 through the communication portal 108, the network 104, or a combination thereof. However, it is understood that the user 204 can directly access or physically interact with the second device 106, access the first device 102 based on directly accessing or physically interacting with the second device 106 or a further device, or a combination thereof.

The user 204 can be represented with a user profile 206. The user profile 206 can include a description or a representation of the user 204 for the computing system 100. The user profile 206 can identify the user 204, describe a trait, a characteristic, or a combination thereof regarding the user 204, or a combination thereof. For example, the user profile 206 can include a user identification 208, a user preference 210, or a combination thereof.

The user identification 208 can include a name or a unique access information for the person, the entity, the group, or a combination thereof generating the request 202. For example, the user identification 208 can include a legal name, a screen name, a phone number, an identification number, a street address, a coordinate, an email address, or a combination thereof for the person, the entity, the group, or a combination thereof generating the request 202.

The user preference 210 is a description of a pattern associated with the user 204. The user preference 210 can include a pattern for partiality, inclination, penchant, fondness, or a combination thereof for the user 204. The user preference 210 can be for various aspects of the user 204, such as for necessities, food, entertainment, activities, goods, services, locations, time, a characteristic or a trait thereof, or a combination thereof.

For example, the user preference 210 can include preferences or avoidances by the user 204 for a type of food or atmosphere, specific brand or price range for a good or a service, a category of entertainment, or a combination thereof. Also for example, the user preference 210 can include a seasonal preferences for locations or activities.

The computing system 100 can determine the user preference 210 based on patterns, direct input from the user 204, or a combination thereof. For example, the computing system 100 can interact with the user 204 or receive information from the user 204 identifying the content, the categorization, the pattern, or a combination thereof for the user preference 210.

Also for example, the computing system 100 can analyze other profiles or introductory information from the user 204, such as an internet profile or a social networking page, for the user preference 210. The computing system 100 can analyze based on identifying keywords, categorizations, patterns, or a combination thereof for the other profiles or introductory information.

Also for example, the computing system 100 can analyze historical data of the user 204 for the user preference 210. The computing system 100 can analyze location data, financial transactions, calendar entries, written communications facilitated through the computing system 100, or a combination thereof for the user preference 210. As a more specific example, the computing system 100 can analyze locations, businesses, services, establishments, or a combination thereof visited by the user 204, bank records of the user 204, the scheduled activities and scheduling information thereof for the user 204, emails or text messages from or received by the user 204, or a combination thereof for the user preference 210.

The computing system 100 can use a request-analysis mechanism 212 to analyze the request 202. The request-analysis mechanism 212 can include a method, a process, a circuit, or a combination thereof configured to process the request 202.

The request-analysis mechanism 212 can be implemented as a specialized circuit or a dedicated unit within a device, a function or a routine, or a combination thereof. As a specific example, the request-analysis mechanism 212 can be based on machine-learning mechanism, pattern analysis mechanism, predetermined tables or groupings, or a combination thereof.

The request-analysis mechanism 212 can be for determining a category, a type, a geographic location, or a combination thereof associated with the request 202. The request-analysis mechanism 212 can be used to determine the category, the type, the geographic location, or a combination thereof associated with the POI, the location, the establishment, the service, the geographic location or area, or a combination thereof corresponding, such as through indication or implication, to the request 202.

The computing system 100 can use the request-analysis mechanism 212 to generate a request profile 210. The request profile 210 can include a description of the request 202. The request profile 210 can include processing result, such as categorizations, associations, patterns, classifications, estimations, or a combination thereof for the request 202. For example, the request profile 210 can include a subject matter 214, a regional-association 216, a complexity level 220, a time sensitivity 222, or a combination thereof.

The subject matter 214 is a description or a categorization for the content of the request 202. The subject matter 214 can include a label, a type, a value, or a combination thereof describing the request 202. The subject matter 214 can be based on a set of values, labels, types, or a combination thereof predetermined by the computing system 100. For example, the subject matter 214 can include a description, such as a type or a categorization, of the answer, the information, the task, the goal or the objective, or a combination sought by the request 202.

The regional-association 216 is a description or a categorization for the map or map data associated with the request 202. The regional-association 216 can include the description or the categorization of the geographic location of the user 204 when the request 202 is generated or submitted for the computing system 100, geographic location associated with the answer, the information, the task, the goal or the objective, or a combination sought by the request 202, or a combination thereof.

For example, the regional-association 216 can include a city, a coordinate, a postal code, a map tile identification, a region, or a combination thereof for the geographic location associated with the user 204, the request 202, or a combination thereof including a question or an answer thereto, a request or an objective thereof, or a combination thereof for the request 202. As a more specific example, the regional-association 216 can include a geotag, a geofence, or a combination thereof based on keywords, locations, user's schedule, or a combination thereof within the content of the request 202 as processed and recognized by the computing system 100.

The complexity level 220 is a representation of a level of knowledge or expertise associated with the request 202. The complexity level 220 can include the level of knowledge or expertise required to fully respond to the request 202. The complexity level 220 can be inferred or determined based on the content of the request 202, the user 204, or a combination thereof. For example, the complexity level 220 can be based on the user preference 210, the user identification 208, the subject matter 214, one or more keywords included in the request 202, a level designated or requested by the user 204 for the request 202, or a combination thereof.

The time sensitivity 222 is a time associated with a validity or a usefulness for the request 202. The time sensitivity 222 can include a timeline, a deadline, a specific date, a duration, or a combination thereof for obtaining the objective of the request 202. For example, the time sensitivity 222 can include a question or a task associated with a specific date, information regarding or related to a specific time, a deadline or a temporal requirement for obtaining the answer or the objective of the request 202, or a combination thereof.

The computing system 100 can similarly use an expertise-analysis mechanism 224 to analyze members 226 for responding to the request 202. The expertise-analysis mechanism 224 can include a method, a process, a circuit, or a combination thereof configured to analyze and identify one or more of the members 226 appropriate for the request 202. The expertise-analysis mechanism 224 can be similar to the request-analysis mechanism 212.

The members 226 can include people, entities, groups, or a combination thereof utilizing or interfacing with the computing system 100. The members 226 can include the people, the entities, the groups, or a combination thereof possessing or utilizing the first device 102, the second device 106, a further device for the computing system 100, or a combination thereof. The members 226 can include consumer users of the computing system 100 instead of special groups dedicated for specific functions, such as customer service or support.

The members 226 can further include the people, the entities, the groups, or a combination thereof utilizing or accessing an application, a software, a specific website, or a combination thereof. The members 226 can further include the people, the entities, the groups, or a combination thereof with a subscription, a membership, a relationship, or a combination thereof associated with the computing system 100. The members 226 can include one or more instances of the user 204 not generating the request 202.

The computing system 100 can use the expertise-analysis mechanism 224 to determine a member profile 228 representing each of the members 226. The member profile 228 is a description or a representation of one or more of the members 226 for the computing system 100. The member profile 228 can be similar to the user profile 206 but for describing one or more of the members 226 instead of the user 204. The member profile 228 can include a member identification 230, a member preference 232, or a combination thereof.

The member identification 230 can include a name or a unique access information for corresponding instance of the members 226. The member identification 230 can be similar to the user identification 208 but for identifying the corresponding member instead of the user 204 generating the request 202.

The member preference 232 is a description of a pattern associated with the corresponding member. The member preference 232 can be similar to the user preference 210 but for describing the corresponding member instead of the user 204 generating the request 202.

The member profile 228 can include location history 234. The location history 234 can include a recording of geographic locations, businesses, entities, or a combination thereof visited or patronized by the corresponding member. For example, the location history 234 can be set of coordinates or routes and the time associated with the corresponding member. Also for example, the location history 234 can include Check-Ins™, reviews or blog entries, transaction records, a processing result thereof, or a combination thereof.

The member profile 228 can further include a record of a previous response 236. The previous response 236 is an answer or a completion of a task in response to a previous instance of the request 202 generated or submitted by the corresponding member. The previous response 236 can include measurable or readable content or marker, including an answer to a previous question, associated with responding to the previous instance of the request 202.

The member profile 228 can further include descriptions or other information associated with the previous response 236. For example, the member profile 228 can include a response category 238, a response rating 240, a previous delay 242, or a combination thereof.

The response category 238 is an abstract categorization or description for the previous response 236. The response category 238 can further include the subject matter 214 for the previous instance of the request 202 associated with the previous response 236. The response category 238 can include the categorization or description for a relationship, a correlation, a pattern, an association, or a combination thereof between the previous response 236 and the previous instance of the request 202.

The response rating 240 is an abstract evaluation of the previous response 236 responding to the previous instance of the request 202. The response rating 240 can include a value, an assessment, a score, or a combination thereof from the previous instance of the user 204 submitting the previous instance of the request 202, the members 226, the computing system 100, or a combination thereof. The response rating 240 can be based on an accuracy, a level of enjoyment or appreciation, usefulness, strength of relationship or association to the request 202, or a combination thereof for the previous instance of the request 202.

The previous delay 242 is a measure of promptness for the previous response 236. The previous delay 242 can include a duration between the previous instance of the request 202 and the previous response 236. The previous delay 242 can further be associated with the timing of the previous response 236 relative to the time sensitivity 222 of the previous instance of the request 202. The previous delay 242 can indicate whether the previous response 236 was generated or provided satisfying the requirement of the time sensitivity 222 of the previous instance of the request 202.

The member profile 228 can further include an response count 244. The response count 244 can include a quantity of instances of the previous response 236 provided by corresponding member. The response count 244 can include a number of individual or independent instances of the previous response 236 satisfying a requirement, such as a specific instance of the response category 238, exceeding a minimum for the response rating 240, satisfying a temporal requirement for the previous delay 242, or a combination thereof.

The member profile 228 can further include a description of knowledge level or proficiency for the corresponding member. For example, the member profile 228 can include a subject expertise 246, a regional expertise 248, or a combination thereof.

The subject expertise 246 is a description of the knowledge level or the proficiency of the corresponding member for a specific field or category of information or task. The subject expertise 246 can correspond to an instance of the subject matter 214 for possible instances of the request 202.

The subject expertise 246 can include a rating or a value representing the knowledge level or the proficiency of the corresponding member. The computing system 100 can determine the subject expertise 246 for the corresponding member. The computing system 100 can determine the subject expertise 246 using a variety of information. Details regarding the subject expertise 246 are described below.

The regional expertise 248 is a description of the knowledge level or the proficiency of the corresponding member for a specific geographic area or location. The regional expertise 248 can correspond to a specific geographic location, a specific geographic area, a type or a category of geographic location or area, or a combination thereof. The regional expertise 248 can correspond to the regional-association 216 for possible instances of the request 202.

The regional expertise 248 can be similar to the subject expertise 246 but for the regional-association 216 instead of the subject matter 214. For example, the regional expertise 248 can include a rating or a value representing the knowledge level or the proficiency of the corresponding member determined by the computing system 100. Details regarding the regional expertise 248 are described below.

The computing system 100 can analyze the members 226 using the member profile 228 to find one or more of the members 226 qualified or best suited to address the request 202 from the user 204. The computing system 100 can use the request profile 210, the user profile 206, the member profile 228, or a combination thereof to analyze the members 226. Details regarding the analysis are described below.

Figure 3:
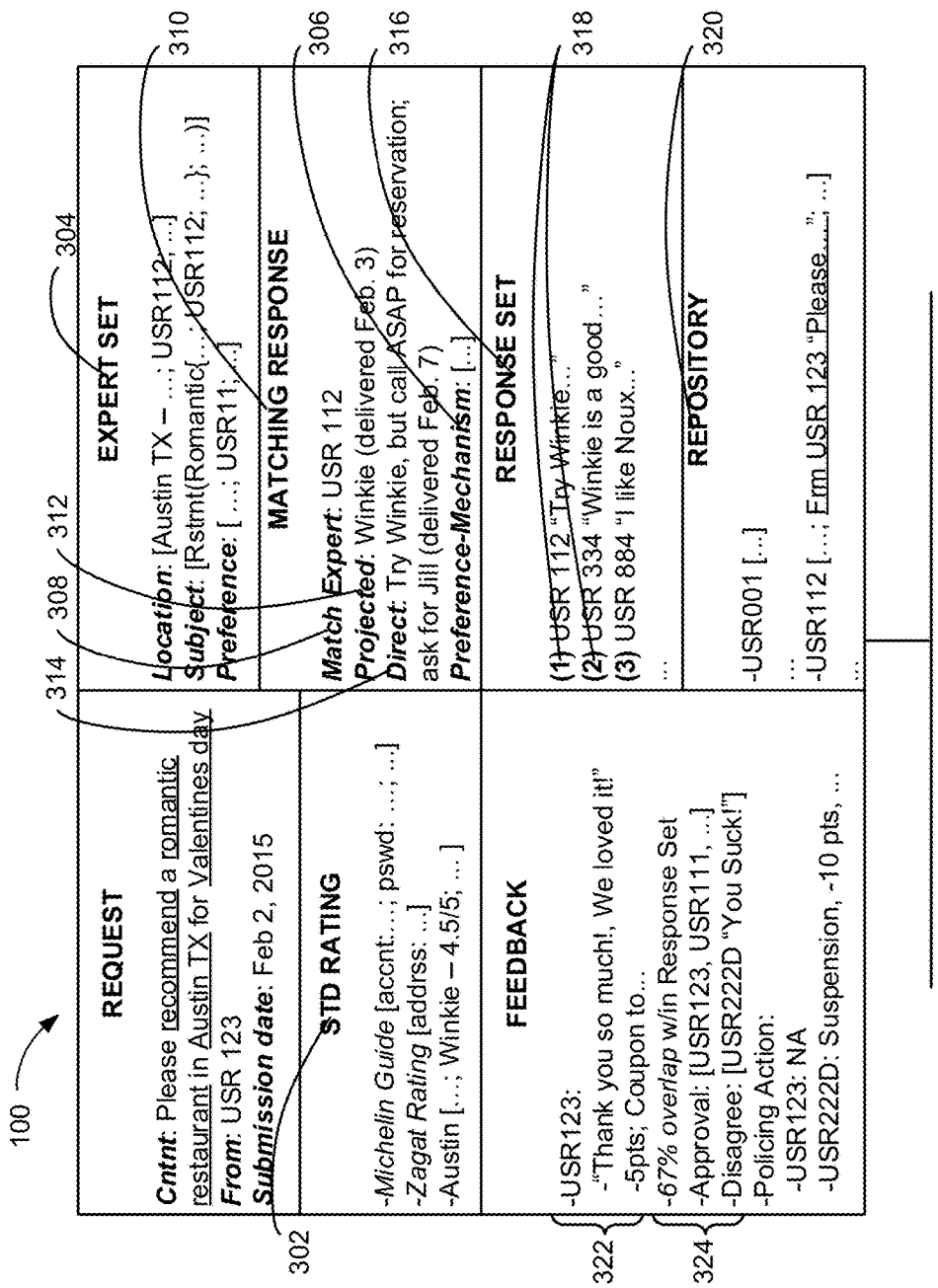
FIG. 3 is a further example of the display interface of the computing system.

Referring now to FIG. 3, therein is shown a further example of the display interface of the computing system 100. The computing system 100 can use a standardized rating 302 for analyzing the members 226 of FIG. 2, the user 204 of FIG. 2, or a combination thereof.

The standardized rating 302 can include an abstract evaluation of a good, a service, a location, an entity, or a combination thereof provided by a person, an entity, a service, or a combination thereof with recognized authority. The standardized rating 302 can include a score, a rating, a ranking, or a combination thereof by a school, such as a film school or a culinary school, a publication, such as a magazine or a website, an entity or a service, such as the Better Business Bureau (BBB) or Michelin Guide™, a person, such as a power blogger or a critic, or a combination thereof.

The computing system 100 can include sources for the standardized rating 302 with approved or recognized authority as predetermined by the computing system 100. The computing system 100 can further include a method or a process for accessing the standardized rating 302, such as a location, a time, an account information, or a combination thereof predetermined by the computing system 100.

The computing system 100 can generate an expert set 304 for the request 202 of FIG. 2. The expert set 304 is a subgrouping of the members 226 determined by the computing system 100 as being suitable to address the request 202. The expert set 304 can include the members 226 with the subject expertise 246 of FIG. 2, the regional expertise 248 of FIG. 2, or a combination thereof sufficient for the request 202.

The expert set 304 can be based on the request profile 210 of FIG. 2 and the member profile 228 of FIG. 2. For example, the expert set 304 can be based on comparing the subject expertise 246, the regional expertise 248, or a combination thereof with the subject matter 214 of FIG. 2, the regional-association 216 of FIG. 2, the complexity level 220 of FIG. 2, or a combination thereof. The computing system 100 can use one or more thresholds or ranges predetermined by the computing system 100 to identify the subgrouping of the members 226 as being suitable to generate the expert set 304.

The computing system 100 can further generate or adjust the expert set 304 using a preference-analysis mechanism 306. The preference-analysis mechanism 306 is a method, a process, a circuit, or a combination thereof configured to analyze preferences or patterns. The preference-analysis mechanism 306 can be for analyzing a similarity or an overlap in the preferences or patterns between the user 204, the members 226, or a combination thereof. The preference-analysis mechanism 306 can determine the similarity or the overlap between the user preference 210 and the member preference 232.

The computing system 100 can determine one or more instances of a matching expert 308 for the request 202. The matching expert 308 is one or more of the members 226 best suited to address the request 202. The matching expert 308 can be one or more of the members 226 determined by the computing system 100 as being best suited to address the request 202, such as by answering or accomplishing a task.

The matching expert 308 can be determined as one or more of the members 226 based on the user profile 206, the member profile 228, the request profile 210, or a combination thereof. For example, the matching expert 308 can be determined as the one or more of the members 226 with the subject expertise 246, the regional expertise 248, or a combination thereof matching or exceeding a threshold or the complexity level 220 for the request, the subject matter 214, the regional-association 216, or a combination thereof. Also for example, the matching expert 308 can be determined as the one or more of the members 226 with the member preference 232 matching or similar to the user preference 210.

The matching expert 308 can be for generating a matching response 310 for the request 202. The matching response 310 is a reply or a reaction directly addressing the request 202. For example, the matching response 310 can include a communication or a progress of a task corresponding to the request 202. As a more specific example, the matching response 310 can include an answer to the question, a status of an activity for the matching expert 308, or a combination thereof requested by the user 204.

The computing system 100 can interact with the matching expert 308 to generate the matching response 310. The computing system 100 can further generate the matching response 310 based on predicting information or activity likely to be generated by the matching expert 308 in response to the request 202.

The computing system 100 can communicate the matching response 310 between the matching expert 308 and the user 204 producing the request 202. The computing system 100 can communicate the matching response 310 to the user 204.

The matching response 310 can include a projected response 312, a direct response 314, or a combination thereof. The projected response 312 is the estimation of the information likely to be generated by the matching expert 308. The computing system 100 can generate the matching response including the projected response 312 based on estimating or predicting information or activity likely to be generated by the matching response 310.

Upon determining the matching expert 308, the computing system 100 can analyze the corresponding instance of the member profile 228, including the previous response 236. The computing system 100 can generate the projected response 312 based on a similarity, a pattern, or a combination thereof in or between the member profile 228, the user profile 206, the request profile 210, or a combination thereof.

The direct response 314 is the information or the status of the activity generated based on directly interacting with the matching expert 308. The direct response 314 can include the information or the answer generated based on communicating with the matching expert 308. The direct response 314 can further include the status based on identifying or detecting an act, a status, a state, or a combination thereof for the matching expert 308.

The matching response 310 can further include a response set 316 based on a ranking sequence 318. The response set 316 is a collection of information or statuses associated multiple instances of the members 226 in response to the request 202. The ranking sequence 318 is an order or a set of values associated with the collection of information or statuses in response to the request 202. The response set 316 can include the collection of information or statuses from various sources arranged or evaluated according to the ranking sequence 318.

The computing system 100 can generate the matching response 310 by determining the matching expert 308 and generating the matching response 310 based on the matching expert 308 as described above. The computing system 100 can further generate the matching response 310 based on generating the response set 316 interacting with multiple instances of the members 226.

The computing system 100 can determine the ranking sequence 318 based on comparing the information or the statuses within initial instance of the response set 316, the members 226 generating the information or the status, or a combination thereof. The computing system 100 can determine the matching response 310, the matching expert 308, or a combination thereof based on the ranking sequence 318 for the response set 316.

The computing system 100 can further determine, record, manage, or a combination thereof for the matching response 310 as the previous response 236. Details regarding the matching response 310, the matching expert 308, or a combination thereof are described below.

The computing system 100 can generate or update a request repository 320 based on the request 202. The request repository 320 is a collection of different instances of the request 202 for one or more of the members 226. The request repository 320 can include independent or separate instances of the request 202 from one or more instances of the user 204.

The request repository 320 can include the request 202 for each or one of the members 226. The request repository 320 can include a queue of the instances of the request 202 applicable to the specific instance of the members 226. The request repository 320 can include the request 202 intended for the specific instance of the members 226 determined as the matching expert for the request 202.

The members 226 can access and address one or more instances of the request 202 in the request repository 320. The request repository 320 can be generated or updated according to an importance, an urgency, or a combination thereof associated with the request 202. The request repository 320 can be generated or updated with a sequence, an evaluation, or a combination thereof for the instances of the request 202 based on the time sensitivity 222, the complexity level 220, the applicable total number of the matching expert 308 available for the request 202, context of the matching expert 308, or a combination thereof.

The computing system 100 can include a requester feedback 322, a community feedback 324, or a combination thereof for the matching response 310. The requester feedback 322 can include a response to the matching response 310 from the user 204 receiving the matching response 310. The requester feedback 322 can be from the user 204 to back to the matching expert 308 associated with the matching response 310.

The requester feedback 322 can include an evaluation, an expression, a responsive reliance, or a combination thereof for the matching response 310, the matching expert 308, or a combination thereof. The requester feedback 322 can further include a usage, an application, a reliance, or a combination thereof for the matching response 310 by the user 204.

For example, the requester feedback 322 can include a communication, a systematic evaluation or rating, a detected action or status, or a combination thereof of or from the user 204 directly associated with the matching response 310, the matching expert 308, or a combination thereof. Also for example, the requester feedback 322 can include a gift or compensation from the user 204 to the matching expert 308.

The community feedback 324 can include response to the matching response 310 from one or more of the members 226 other than the user 204 receiving the matching response 310. The community feedback 324 can include a method or a process for the members 226 to police and evaluate the responses, the expertise, or a combination thereof.

The community feedback 324 can be similar to the requester feedback 322 and include an evaluation, an expression, a responsive reliance, or a combination thereof for the matching response 310, the matching expert 308, or a combination thereof. The community feedback 324 can be from the members 226 instead of the user 204 as in the requester feedback 322.

The computing system 100 can utilize the requester feedback 322, the community feedback 324, or a combination thereof to evaluate the expertise of the members 226. The computing system 100 can use the requester feedback 322, the community feedback 324, or a combination thereof to determine the response rating 240 for the matching response 310 or the response set 316.

The computing system 100 can further use the requester feedback 322, the community feedback 324, or a combination thereof to determine the subject expertise 246, the regional expertise 248, or a combination thereof for the matching expert 308 or the members 226 providing a response. The computing system 100 can further use the requester feedback 322, the community feedback 324, or a combination thereof to determine, refine, adjust, or a combination thereof for the user preference 210, the member preference 232 for the matching expert 308 or the members 226 providing a response, or a combination thereof.

Figure 4:
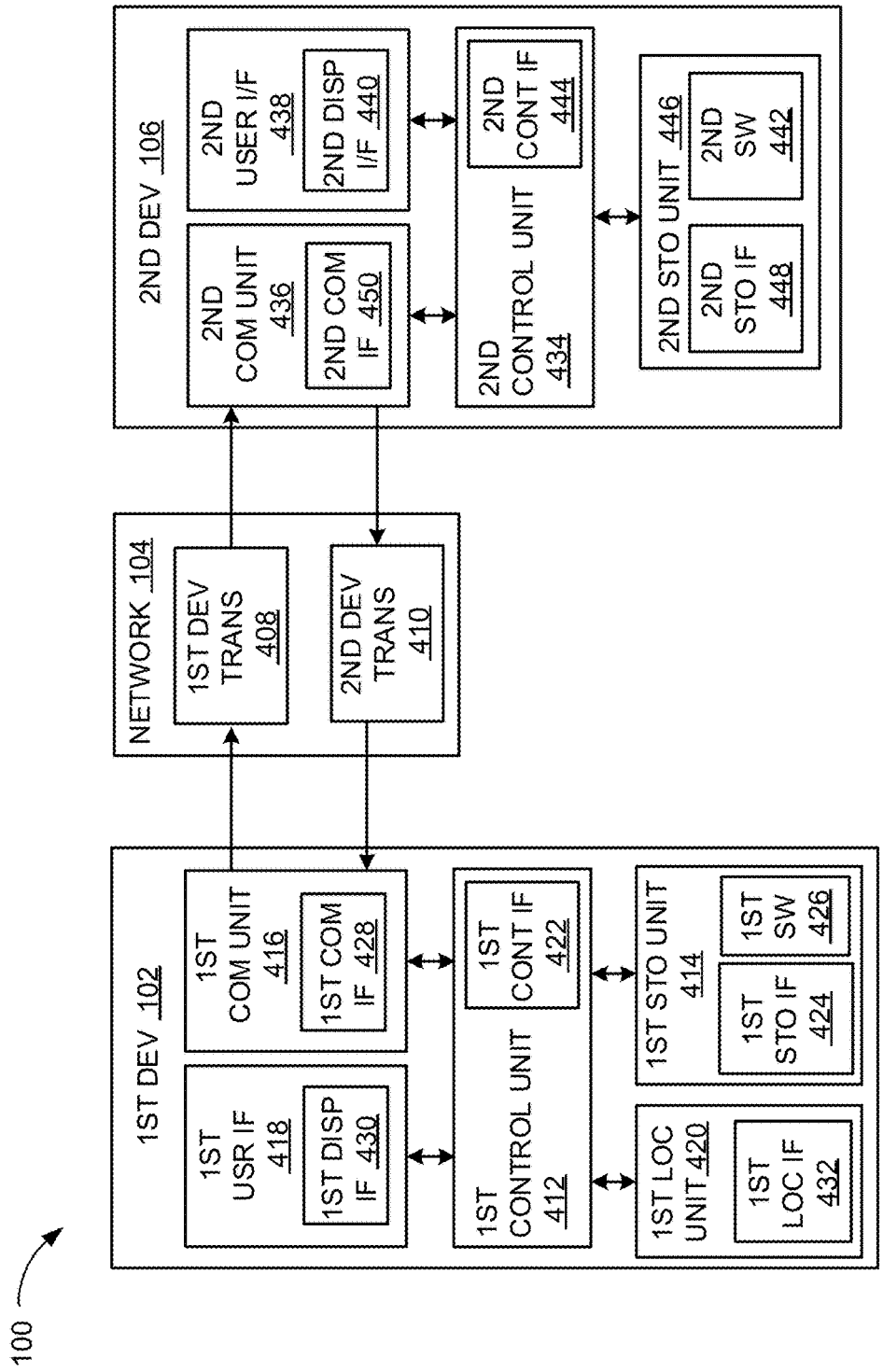
FIG. 4 is an exemplary block diagram of the computing system.

Referring now to FIG. 4, therein is shown an exemplary block diagram of the computing system 100. The computing system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418, and a first location unit 420. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a desktop computer, and the network 104.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100, including receiving location information from the first location unit 420. The first control unit 412 can further execute the first software 426 for interaction with the network 104 via the first communication unit 416.

The first location unit 420 can generate location information, current heading, current acceleration, and current speed of the first device 102, as examples. The first location unit 420 can be implemented in many ways. For example, the first location unit 420 can function as at least a part of the global positioning system, an inertial navigation system, a cellular-tower location system, a pressure location system, or any combination thereof. Also, for example, the first location unit 420 can utilize components such as an accelerometer or GPS receiver.

The first location unit 420 can include a first location interface 432. The first location interface 432 can be used for communication between the first location unit 420 and other functional units in the first device 102. The first location interface 432 can also be used for communication external to the first device 102.

The first location interface 432 can receive information from the other functional units or from external sources, or can transmit information to the other functional units or to external destinations. The external sources and the external destinations refer to sources and destinations external to the first device 102.

The first location interface 432 can include different implementations depending on which functional units or external units are being interfaced with the first location unit 420. The first location interface 432 can be implemented with technologies and techniques similar to the implementation of the first control unit 412.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or an antenna, for interaction with the network 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The computing system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 5:
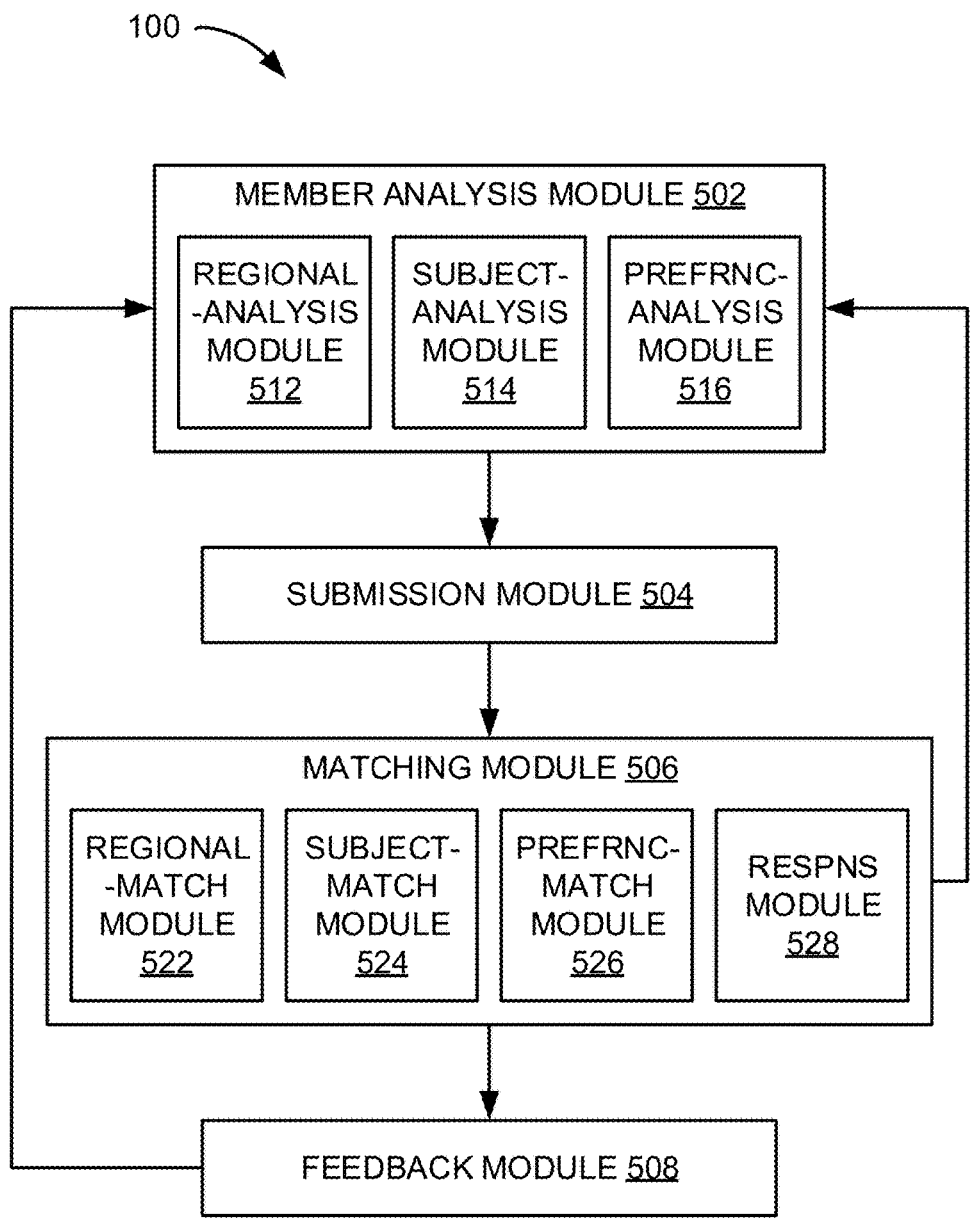
FIG. 5 is a control flow of the computing system.

Referring now to FIG. 5, therein is shown a control flow of the computing system 100. The computing system 100 can include a member analysis module 502, a submission module 504, a matching module 506, a feedback module 508, or a combination thereof.

The member analysis module 502 can be coupled to the submission module 504, the matching module 506, the feedback module 508, or a combination thereof. The submission module 504 can be further coupled to the matching module 506. The matching module 506 can be further coupled to the feedback module 508.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The member analysis module 502 is configured to analyze the members 226 of FIG. 2 for the computing system 100. The member analysis module 502 can analyze the members 226 by determining the member profile 228 of FIG. 2 corresponding to one or more of the members 226 for representing the members 226. The member analysis module 502 can determine the member profile 228 for each of the members 226 for representing each of the members 226.

The member analysis module 502 can collect and identify various information regarding the members 226 for determining the member profile 228. The member analysis module 502 can further analyze the collected and identified information to determine the member profile 228.

The member analysis module 502 can collect or identify the information for the member identification 230 of FIG. 2, the location history 234 of FIG. 2, or a combination thereof. The member analysis module 502 can collect or identify various information based on interacting with the members 226. The member analysis module 502 can interact through the first user interface 418 of FIG. 4, the second user interface 438 of FIG. 4, other user interface of other device, or a combination thereof.

The member analysis module 502 can further collect or identify the information using the first communication unit 416 of FIG. 4, the second communication unit 436 of FIG. 4, the location unit 420 of FIG. 4, other communication unit of other device, or a combination thereof. The member analysis module 502 can process or identify the information using the first control unit 412 of FIG. 4, the second control unit 434 of FIG. 4, other control unit of other device, or a combination thereof. The member analysis module 502 can store the various information or the processing results in the first storage unit 414 of FIG. 4, the second storage unit 446 of FIG. 4, other storage unit of other device, or a combination thereof.

For example, the member analysis module 502 can utilize one or more interface, one or more communication unit, or a combination thereof to collect or identify identification information, such as a name, a telephone number, membership information, a screen name, a password, an account information, or a combination thereof from each of the members 226 for the member identification 230. Also for example, the member analysis module 502 can utilize one or more control unit, one or more communication unit, or a combination thereof to collect or identify the device identification, such as a serial number, a model number, an address, or a combination thereof, for the first device 102 of FIG. 1, the second device 106 of FIG. 1, the other device, or a combination thereof belonging to or controlled by each of the members 226 for the member identification 230.

Also for example, the member analysis module 502 can utilize one or more location unit, one or more communication unit, or a combination thereof to collect location information for the first device 102, the other device, or a combination thereof being used or carried by each of the members for the location history 234. The member analysis module 502 can identify a time or a duration associated with the location information. The member analysis module 502 can store the location information, the associated time or duration, or a combination thereof as the location history 234 corresponding to each of the members 226.

The member analysis module 502 can further identify other location information generated by the members 226. For example, the member analysis module 502 can process or analyze user-generated content, such as video clip submissions or uploads, blog entries, checking-in data, online reservations, reviews, search queries, accessed links, recommendations, or a combination thereof from each of the members 226. The member analysis module 502 can identify or extract a location, an entity, a service, a business, a good, an activity, or a combination thereof from the user-generated content using keyword recognition, pattern recognition, category or mechanism for generating the content, or a combination thereof.

Continuing with the example, the member analysis module 502 can further distinguish the user-generated content associated with physical experience or presence of the corresponding member. The member analysis module 502 can identify the physical experience or presence similarly using keywords, pattern recognition, machine-learning mechanism, or a combination thereof. The member analysis module 502 can further store the location, the entity, the service, the business, the good, the activity, or a combination thereof associated with the physical experience or presence, associated time or duration, or a combination thereof as the location history 234 for the corresponding member.

Similarly, the member analysis module 502 can track or update previous instances of the request 202 of FIG. 2, previous instances of the matching response 310 of FIG. 2, or a combination thereof provided by each of the members 226. The member analysis module 502 can record the request 202, the matching response 310, a time associated thereto, or a combination thereof provided by each of the members 226 in the corresponding instance of the member profile 228. For example, the member analysis module 502 can record the previous instance of the matching response 310 as the previous response 236 of FIG. 2 from each of the members 226.

The member analysis module 502 can further determine the member profile 228 including descriptive information for the previous response 236. For example, the member analysis module 502 can track or update the request profile 210 of FIG. 2 associated with the previous response 236. The member analysis module 502 can use information processed by the submission module 504.

As a more specific example, the member analysis module 502 can track or update the response category 238 of FIG. 2 based on the subject matter 214 of FIG. 2 or the complexity level 220 of FIG. 2 or the regional-association 216 of FIG. 2, the previous delay 242 of FIG. 2 based on the time sensitivity 222, or a combination thereof. Details regarding the submission module 504 are described below.

Also for example, the member analysis module 502 can track or update information for the response rating 240 of FIG. 2. The member analysis module 502 can track or update the response rating 240 based on the requester feedback 322 of FIG. 3, the community feedback 324 of FIG. 3, the previous response 236, or a combination thereof.

The member analysis module 502 can determine the response rating 240 for the previous response 236. The member analysis module 502 can determine the response rating 240 based on the requester feedback 322, the community feedback 324, the previous response 236, the request profile 210, or a combination thereof. The member analysis module 502 can determine the response rating 240 in a variety of ways.

For example, the member analysis module 502 can determine the response rating 240 based on evaluating the requester feedback 322, the community feedback 324, or a combination thereof. The member analysis module 502 can calculate a value representing a satisfaction level provided by the previous response 236. As a more specific example, the member analysis module 502 can use keywords, patterns, scoring or rating system predetermined by the computing system 100, or a combination thereof to evaluate the requester feedback 322, the community feedback 324, or a combination thereof.

Also for example, the member analysis module 502 can determine the response rating 240 based on combining or averaging the requester feedback 322, the community feedback 324, or a combination thereof. As a more specific example, the member analysis module 502 can determine the response rating 240 using an evaluated result, a value from the predetermined rating or scoring system, or a combination thereof as an input to an equation predetermined for combining or averaging the information.

Also for example, the member analysis module 502 can determine the response rating 240 based on the overlap or similarity in the previous response 236 and the corresponding instance of the request 202. The member analysis module 502 can use keyword matching, the machine-learning mechanism, the pattern recognition, or a combination thereof to determine the overlap or similarity between the previous response 236 and the corresponding instance of the request 202.

The member analysis module 502 can further determine the response count 244 of FIG. 2. The member analysis module 502 can determine the response count 244 based on determining the quantity of the previous response 236 provided by each of the members 226 as recorded or tracked in the member profile 228. The member analysis module 502 can further determine the response count 244 based on determining the quantity of different instances of the request 202 addressed by each of the members 226 as recorded or tracked in the member profile 228.

The member analysis module 502 can further determine the standardized rating 302 of FIG. 3 for analyzing the members 226. The member analysis module 502 can include one or more sources, timing, access information, process, or a combination thereof for determining the standardized rating 302.

For example, the member analysis module 502 can include the source including a school, such as a film school or a culinary school, a publication, such as a magazine or a website, an entity or a service, such as the Better Business Bureau (BBB) or Michelin Guide™, a person, such as a power blogger or a critic, or a combination thereof. Also for example, the member analysis module 502 can include an address, a publication date or schedule, a posting date or schedule, an account information, a password or certification, or a combination thereof for accessing the score, the rating, the ranking, or a combination thereof.

The member analysis module 502 can further analyze the members 226 for knowledge, experience, access to information, ability, like, dislike, partiality, inclination, or a combination thereof. The member analysis module 502 can determine the member profile 228 including the subject expertise 246 of FIG. 2, the regional expertise 248 of FIG. 2, the member preference 232 of FIG. 2, or a combination thereof using the expertise-analysis mechanism 224 of FIG. 2, the preference-analysis mechanism 306, or a combination thereof for representing each of the members 226. The member analysis module 502 can include a regional-analysis module 512, a subject-analysis module 514, a preference-analysis module 516, or a combination thereof for analyzing the members 226.

The regional-analysis module 512 is configured to analyze familiarity or capability of the members 226 with respect to one or more geographic locations. The regional-analysis module 512 can analyze the familiarity or capability with the geographic locations by determining the regional expertise 248 for representing each of the members 226.

The regional-analysis module 512 can determine the regional expertise 248 based on the location history 234. The regional-analysis module 512 can determine the regional expertise 248 based on a length of time each of the members has spent for the corresponding geographic location or area as indicated by the location history 234.

For example, the regional-analysis module 512 can determine the regional expertise 248 based on a length or a duration of stay or residency at a particular area, number of visits or traversals to a particular location, a frequency of travels or visits within a particular area, a number of different locations or roads travelled or visited within a particular area, or a combination thereof as indicated by the location history 234. Also for example, the regional-analysis module 512 can determine the regional expertise 248 based on a type of locations or paths utilized by each of the corresponding members 226 as indicated by the location history 234.

As a more specific example, the regional-analysis module 512 can determine the regional expertise 248 to be higher when the corresponding member utilizes smaller local streets, deviates from a prescribed path, travels without guidance, or a combination thereof. Also as a more specific example, the regional-analysis module 512 can determine the regional expertise 248 to be higher when the corresponding member's reaction or avoidance of traffic delays, such as based on the location or the activity of the corresponding member around times of traffic delays.

Also for example, the regional-analysis module 512 can determine the regional expertise 248 based on contextual information associated with geographic locations relative to each of the members 226 as indicated by the location history 234. As a more specific example, the regional-analysis module 512 can determine geographic locations or areas with recognizable abstract significance to each of the members 226, such as place of residency, occupation, home town, a location associated with significant events, including a wedding or a birth, a geographic location associated with a family member or a close friend, or a combination thereof. The regional-analysis module 512 can determine an area surrounding the contextual location and determine the regional expertise 248 to be greater for such areas.

Also for example, the regional-analysis module 512 can determine the regional expertise 248 based on searches associated with the corresponding area as indicated by the location history 234 or a search history. The regional-analysis module 512 can determine the regional expertise 248 to be higher as a number or a quantity of searches associated with the corresponding area increases.

Also for example, the regional-analysis module 512 can determine the regional expertise 248 based on the previous response 236. The regional-analysis module 512 can determine the regional expertise 248 based on the response rating 240 and the regional-association 216 for the previous response 236. The regional-analysis module 512 can determine the regional expertise 248 based on an equation or a process predetermined by the computing system 100 using the response rating 240, the response category 238, the response count 244, the complexity level 220 of the corresponding request 202, frequency of the previous response 236, or a combination thereof for the previous response 236 for the geographic area corresponding to the regional-association of the request 202.

Also for example, the regional-analysis module 512 can determine the regional expertise 248 based on the standardized rating 302. The regional-analysis module 512 can identify the standardized rating 302 or an establishment addressed or reviewed by the standardized rating 302 associated with a particular geographic area. The regional-analysis module 512 can compare the review or affinity of the members 226 for the common establishment with the standardized rating 302. The regional-analysis module 512 can compare using the previous response 236, the location history 234, or a combination thereof and the standardized rating 302.

The subject-analysis module 514 is configured to analyze the familiarity or ability of the members 226 with respect to one or more categories for the request 202. The subject-analysis module 514 can analyze the familiarity or capability with one or more instances of the subject matter 214 by determining the subject expertise 246 for representing each of the members 226.

The subject-analysis module 514 can determine the subject expertise 246 based on information in the member profile 228. The subject-analysis module 514 can determine the subject expertise 246 based on the location history 234, the previous response 236, the response count 244, the contextual information, personal information, or a combination thereof. The subject-analysis module 514 can be similar to the regional-analysis module 512 but for determining the subject expertise 246.

For example, the subject-analysis module 514 can determine the subject expertise 246 based on the location history 234. The subject-analysis module 514 can determine the subject expertise 246 based on the category of the geographic location visited, frequency or duration of associated with the category, number of visits for the category, or a combination thereof.

Continuing with the example, the subject-analysis module 514 can use the map data to determine the category for the geographic location corresponding to the subject matter 214. The subject-analysis module 514 can use an equation, a process, or a combination thereof predetermined by the computing system 100 with the quantity of visits for the category of location visited, frequency or duration associated with the visit, or a combination thereof.

Also for example, the subject-analysis module 514 can determine the subject expertise 246 based on the previous response 236. The subject-analysis module 514 can determine the subject expertise 246 based on the subject matter 214 or the complexity level 220 of the request 202 corresponding to the previous response 236, the response rating 240, the response category 238, the response count 244, or a combination thereof using an equation, a method, or a combination thereof predetermined by the computing system 100.

Also for example, the subject-analysis module 514 can determine the subject expertise 246 based on contextual information associated with the previous response 236, the request 202, the corresponding member, or a combination thereof. As a more specific example, the subject-analysis module 514 can determine the subject expertise 246 based on educational or professional background of the corresponding member as identified by the member identification 230 or as provided by the corresponding member. Also as a more specific example, the subject-analysis module 514 can determine the subject expertise 246 based on experiences or activities of close friends or relatives connected to the corresponding member.

Also for example, the subject-analysis module 514 can determine the subject expertise 246 based on the standardized rating 302. The subject-analysis module 514 can identify the standardized rating 302 or an establishment addressed or reviewed by the standardized rating 302 associated with a particular category or subject matter. The subject-analysis module 514 can compare the review or affinity of the members 226 for the common establishment with the standardized rating 302. The regional-analysis module 512 can compare using the previous response 236, the location history 234, or a combination thereof and the standardized rating 302.

The preference-analysis module 516 is configured to analyze a like, a dislike, or an inclination for representing the members 226. The preference-analysis module 516 can analyze the like, the dislike, or the inclination by determining the member preference 232 for representing each of the members 226. The preference-analysis module 516 can be similar to the regional-analysis module 512, the subject-analysis module 514, or a combination thereof, but for determining the member preference 232.

For example, the preference-analysis module 516 can determine the member preference 232 based on analyzing a number of times a certain location or a type of location has been visited by the corresponding member, a duration or a frequency associated thereto, or a combination thereof as indicated by the location history 234. The preference-analysis module 516 can determine the member preference 232 using the pattern analysis, the machine-learning mechanism, an equation or a process predetermined by the computing system 100, or a combination thereof.

Also for example, the preference-analysis module 516 can determine the member preference 232 based on the previous response 236, the response rating 240 thereof, or a combination thereof. The preference-analysis module 516 can determine the member preference 232 based on assuming that expertise and preference are similar and related for the members 226.

Also for example, the preference-analysis module 516 can determine the member preference 232 based on similarities to other members 226 as indicated by the location history 234, the previous response 236, the response rating 240 thereof, the requester feedback 322, the community feedback 324, or a combination thereof. The preference-analysis module 516 can determine similarity based on positive feedback for the previous response 236.

The preference-analysis module 516 can determine the member preference 232 for identifying frequently visited locations or categories of locations, frequently performed or partaken activities or categories thereof, a pattern thereof, or a combination thereof. The preference-analysis module 516 can determine the member preference 232 for identifying similarities in pattern, location, the subject matter 214, the subject expertise 246, the regional expertise 248, or a combination thereof between members 226.

The preference-analysis module 516 can use the standardized rating 302 for determining the member preference 232. The preference-analysis module 516 can use the standardized rating 302 as an average or majority preference. The preference-analysis module 516 can determine the member preference 232 based on a value or a percentage representing similarity between the affinity or the review from the members 226 and the standardized rating 302 for a common establishment. The preference-analysis module 516 can determine the member preference 232 for comparing the members 226 to a common reference point through the standardized rating 302.

It has been discovered that each of the subject expertise 246, the regional expertise 248, and the member preference 232 determined, at least in part, without direct communication or interaction with the corresponding member provides increased integrity and accuracy of the computing system 100. The computing system 100 can determine the subject expertise 246, the regional expertise 248, the member preference, or a combination thereof based on the location history 234, the previous response 236, the requester feedback 322, the community feedback 324, other indirect communication of contextual information, or a combination thereof without directly asking questions to the members 226 for the purposes of the determination. The determination can be made based on behavior over time and without direct interaction, which decreases opportunities for false answers provided by the members 226, thereby increasing the integrity and accuracy of the computing system 100.

As described above, the member analysis module 502 can use the first user interface 418, the second user interface 438, other user interface for other device, the first communication unit 416, the second communication unit 436, other communication unit, or a combination thereof to collect or identify information. The member analysis module 502 can use the first control unit 412, the second control unit 434, other control unit of other device, or a combination thereof to determine the member profile 228 including the member preference 232, the subject expertise 246, the regional expertise 248, or a combination thereof. The member analysis module 502 can store the member profile 228 in the first storage unit 414, the second storage unit 446, other storage unit for other device, or a combination thereof.

After processing the member profile 228, the control flow can pass from the member analysis module 502 to the submission module 504. For example, the control flow can pass by having a processing result, such as the member profile 228 as an output from the member analysis module 502 to an input of the submission module 504.

Also for example, the control flow can further pass by storing the processing result at a location known and accessible to the submission module 504. Also for example, the control flow can further pass by notifying the submission module 504, such as by using a flag, an interrupt, a status signal, or a combination thereof. Also for example, the control flow can further pass using a combination of the processes described above.

The submission module 504 is configured to receive and analyze the request 202. The submission module 504 can receive the request 202 from the user 204 of FIG. 2. The submission module 504 can receive the request 202 generated, sourced, provided, or a combination thereof by the user 204. The submission module 504 can receive the request 202 using the first user interface 418, the second user interface 438, other user interface for other device, the first communication unit 416, the second communication unit 436, other communication unit, or a combination thereof.

The submission module 504 can analyze the request 202 by generating the request profile 210 of FIG. 2. The submission module 504 can generate the request profile 210 based on the request 202 for processing the request 202 using the request-analysis mechanism 212 of FIG. 3. The submission module 504 can generate the request profile 210 including the subject matter 214, the regional-association 216, or a combination thereof for describing the request 202. The submission module 504 can further generating the request profile 210 based on calculating time sensitivity 222 for the request 202.

The submission module 504 can generate the request profile 210 including the subject matter 214, the regional-association 216, the complexity level 220, or a combination thereof in a variety of ways. For example, the submission module 504 can generate the request profile 210 including the subject matter 214, the regional-association 216, or a combination thereof based on identifying and analyzing key words in the content of the request 202.

Continuing with the example the submission module 504 can include one or more sets of keywords, clusters, models, or a combination thereof predetermined by the computing system 100 to be associated with different instances of the subject matter 214, the regional-association 216, the complexity level 220, or a combination thereof. As a more specific example, the submission module 504 can include "food", "dinner", "taste", "date", or a combination thereof for recognizing the subject matter 214 for food or restaurants. Also as a more specific example, the submission module 504 can include names of cities, states, neighborhoods, or a combination thereof, postal codes, coordinates, or a combination thereof for recognizing the regional-association 216.

Also for example, the submission module 504 can determine the subject matter 214, the regional-association 216, or a combination thereof based on determining a similarity between the map data and the content of the request 202. As a more specific example, the submission module 504 can determine the subject matter 214, the regional-association 216, or a combination thereof based on identifying a match, a similarity, a pattern, or a combination thereof in the content of the request 202 and the details for points of interest (POI), such as names or locations, location names, or a combination thereof.

Also for example, the submission module 504 can receive the designation or classifications for the subject matter 214, the regional-association 216, the complexity level 220, the time sensitivity 222, or a combination thereof directly from the user 204. The submission module 504 can interact with the user to receive the values or designations for the subject matter 214, the regional-association 216, the complexity level 220, the time sensitivity 222, or a combination thereof.

The submission module 504 can further calculate the time sensitivity 222 for the request 202 in similar ways. For example, the submission module 504 can identify key words representing dates or sequences and associated words, such as "on", "by", "until", "before", or a combination thereof.

The submission module 504 can identify the user 204 associated with the request 202 from the members 226. The submission module 504 can determining the user preference 210 of FIG. 2 based on the member profile 228 corresponding to the user 204. For example, the user identification 208 can be the member identification 230 of the member pro-viding, generating, submitting, or a combination thereof for the request 202. Such member can be designated as the user 204. Also for example, the user preference 210 can be the member preference 232 corresponding to the member designated as the user 204 for the particular instance of the request 202.

The submission module 504 can use the first user interface 418, the second user interface 438, other user interface for other device, the first communication unit 416, the second communication unit 436, other communication unit, or a combination thereof to receive the request 202, interact with the user 204, or a combination thereof. The submission module 504 can use the first control unit 412, the second control unit 434, other control unit of other device, or a combination thereof to determine the request profile 210, the subject matter 214, the regional-association 216, the complexity level 220, the time sensitivity 222, or a combination thereof. The submission module 504 can store the request profile 210 and other included information in the first storage unit 414, the second storage unit 446, other storage unit for other device, or a combination thereof.

After processing the request 202, the control flow can pass from the submission module 504 to the matching module 506. The control flow can pass similarly as described above between the member analysis module 502 and the submission module 504, but using processing results of the submission module 504, such as the request profile 210.

The matching module 506 is configured to enable interaction between the user 204 and the members 226 for addressing the request 202. The matching module 506 can determine the one or more of the members 226 best suited or qualified to address the request 202 and facilitate interaction between such members and the user 204.

The matching module 506 can further enable communications between the members and the user 204 and identify the communication best suited or matching the request 202. The matching module 506 can determine the one or more members 226 best suited or qualified to address the request 202 based on determining the matching expert 308 of FIG. 3 for the request 202. The matching module 506 can determine the matching expert 308 based on the request profile 210, instances of the member profile 228 for representing the members 226, the user profile 206, the standardized rating 302, or a combination thereof.

The matching module 506 can determine the matching expert 308, the expert set 304, or a combination thereof for the request 202 as the member with the member profile 228 matching the request profile 210. The matching module 506 can determine the matching expert 308, the expert set 304, or a combination thereof for the request 202 based on regional expertise 248, the subject expertise 246, or a combination thereof based on the location history 234, the previous response 236, the response category 238, the previous delay 242, the requester feedback 322, the community feedback 324, the standardized rating 302, or a combination thereof.

The matching module 506 can include a regional-match module 522, a subject-match module 524, a preference-match module 526, a response module 528, or a combination thereof for enabling interaction for addressing the request 202.

The regional-match module 522 is configured to determine the members 226 suited or qualified to address the request 202 based on geographical area. The regional-match module 522 can determine one or more of the members 226 best suited or qualified as the matching expert 308, the expert set 304 of FIG. 3, or a combination thereof based on the regional expertise 248.

The regional-match module 522 can search the member profile 228 corresponding to the members 226 to determine the one or more of the members 226 with the regional expertise 248 matching or including the regional-association 216 of the request 202. The regional-match module 522 can compare the coordinates, boundaries, regional markers, or a combination thereof for the regional-association 216 and the regional expertise 248.

The regional-match module 522 can generate the expert set 304 to include the one or more members 226 having experience or knowledge regarding the geographic location associated with the request 202. The regional-match module 522 can generate the expert set 304 based on similarities or overlap between the regional-association 216 and the regional expertise 248.

The regional-match module 522 can determine the one or more of qualified instances of the members 226 using the complexity level 220 to match the level of expertise or as a threshold value for determining the matching expert 308, the expert set 304, or a combination thereof. For example, the matching module 506 can determine the matching expert 308, the expert set 304, or a combination thereof to include the member with the regional expertise 248 matching or exceeding than the complexity level 220.

The subject-match module 524 is configured to determine the members 226 suited or qualified to address the request 202 based on the subject matter 214. The subject-match module 524 can determine one or more of the members 226 best suited or qualified as the matching expert 308, the expert set 304, or a combination thereof based on the subject expertise 246.

The subject-match module 524 can search the member profile 228 corresponding to the members 226 to determine the one or more of the members 226 with the subject expertise 246 matching or including the subject matter 214 of the request 202. The regional-match module 522 can compare categories, clusters, patterns, keywords, or a combination thereof for the subject matter 214 and the subject expertise 246.

The subject-match module 524 can generate the expert set 304 to include the one or more members 226 having experience or knowledge regarding the subject matter 214 associated with the request 202. The regional-match module 522 can generate the expert set 304 based on similarities or overlap between the subject matter 214 and the subject expertise 246.

The subject-match module 524 can determine the one or more of qualified instances of the members 226 using the complexity level 220 to match the level of expertise or as a threshold value for determining the matching expert 308, the expert set 304, or a combination thereof. For example, the matching module 506 can determine the matching expert 308, the expert set 304, or a combination thereof to include the member with the subject expertise 246 matching or exceeding than the complexity level 220.

The subject-match module 524 can be independent of the regional-match module 522 or sequentially connected to the regional-match module 522. For example, the subject-match module 524 can determine the members 226 with the subject expertise 246 sufficient for the subject matter 214 of the request 202 from amongst all of the members 226 or a subset of the members 226 independent of the operations or processes of the regional-match module 522.

Also for example, the subject-match module 524 can generate the expert set 304 based on the subject expertise 246 before the regional-match module 522. The regional-match module 522 can then further narrow the expert set 304 based on the regional expertise 248 as described above.

Also for example, the subject-match module 524 can narrow the expert set 304 based on the subject expertise 246 after the regional-match module 522 generates the expert set 304. The subject-match module 524 and the regional-match module 522 can be sequentially connected generate and narrow the expert set 304 to determine the members 226 with both the subject expertise 246 and the regional expertise 248 sufficient for the request 202 according to the subject matter 214, the regional-association 216, the complexity level 220, or a combination thereof.

The preference-match module 526 is configured to determine the members 226 similar to the user 204. The preference-match module 526 can determine the matching expert 308 based on similarities in likes or preferences between the user 204 and the members 226. The preference-match module 526 can determine the matching expert 308 to include the member with the member preference 232 most similar to or overlapping the user preference 210. The preference-match module 526 can quantize the level of similarity or overlap, and determine the matching expert 308 to include the member with the member preference 232 matching or overlapping the user preference 210 relative to a predetermined threshold.

The preference-match module 526 can determine the matching expert 308 in sequence with the regional-match module 522, the subject-match module 524, or a combination thereof. The preference-match module 526 can determine the matching expert 308 based on the preference from within the expert set 304 or without the expert set 304.

For example, the preference-match module 526 can determine the matching expert 308 as one or more of the members within the expert set 304 with the most similarity or overlap with the user 204 based on the member preference 232 and the user preference 210, satisfying the predetermined threshold for the overlap or similarity, or a combination thereof. The preference-match module 526 can determine the matching expert 308 from within the expert set 304 generated and narrowed using both the regional-match module 522 and the subject-match module 524.

Also for example, the preference-match module 526 can determine the matching expert 308 based on output of the subject-match module 524 or the regional-match module 522. As a more specific example, the preference-match module 526 can determine the matching expert 308 as one or more of the members 226 with the member preference 232 matching the user preference 210, and also knowing the associated geographic area sufficient for addressing the request 202, as indicated by the regional-match module 522.

Also as a more specific example, the preference-match module 526 can determine the matching expert 308 based on similarities or overlaps from amongst the members 226 knowing the subject matter 214, as indicated by the subject-match module 524. The computing system 100 can determine the matching expert 308 for alternative suggestions when the regional expertise 248 of the matching expert 308 does not match or overlap the regional-association 216 but is within a predetermined distance or range of the regional-association 216.

The preference-match module 526 can further determine the matching expert 308 based on comparing the standardized rating 302 with the member preference 232, the user preference 210, or a combination thereof. The preference-match module 526 can determine the matching expert 308 based on identifying the user 204, one or more instance of the members 226, or a combination thereof similar or different from the standardized rating 302.

The preference-match module 526 can compare the standardized rating 302 with the member preference 232 for the overall group of the members 226. The preference-match module 526 can further compare the standardized rating 302 with the user preference 210. The preference-match module 526 can initiate comparison of individual instances of the member preference 232 to the user preference 210 when comparisons to the standardized rating 302 between the user preference 210 and the members 226 do not overlap.

For example, the preference-match module 526 can compare the standardized rating 302 with the member preference 232 for the overall group of the members 226 to verify an overall characterization, commonality, or validity for the standardized rating 302. The preference-match module 526 can validate the standardized rating 302 using a threshold number of the members 226 include the member preference 232 similar to or overlapping the standardized rating 302, such as represented by another threshold, with the thresholds predetermined by the computing system 100.

Continuing with the example, the preference-match module 526 can pass the validation back to the member analysis module 502 for determining the expertise. The preference-match module 526 can further use similar process to compare the standardized rating 302 with the user preference 210. The preference-match module 526 can use the output of the comparison as a representation of similarity to the average or uniqueness of the user 204. The preference-match module 526 can use the uniqueness of the user 204 to trigger individual comparison or further analysis as described above.

The response module 528 is configured to enable communications for addressing the request 202. The response module 528 can communicate to or from for the user 204, the matching expert 308, the expert set 304, or a combination thereof. For example, the response module 528 can communicate the request 202 for the matching expert 308, communicate the matching response 310 of FIG. 3 form the matching expert 308 to the user 204, or a combination thereof.

The response module 528 can communicate the request 202 through the first device 102, the second device 106, other device, or a combination thereof. The response module 528 can further the first user interface 418, the second user interface 438, other user interface for other device, or a combination thereof to the user 204, the matching expert 308, or a combination thereof.

The response module 528 can use the first communication unit 416, the second communication unit 436, other communication unit, or a combination thereof to communicate the request 202, the matching response 310, other related information, or a combination thereof between devices in the computing system 100. The response module 528 can use the user identification 208, the member identification 230 for the matching expert 308, or a combination thereof to communicate between devices, people, or a combination thereof.

The response module 528 can communicate the request 202 to the matching expert 308 directly based on displaying an image or a notice, creating a sound, or a combination thereof without any delays. The response module 528 can further communicate the request 202 using the request repository 320 of FIG. 3.

The response module 528 can update the request repository 320 for the member determined to be the matching expert 308 to include the request 202. The response module 528 can update based on including a message, a link, a communication, or a combination thereof for accessing the request 202 along with other prior instances of the request 202 intended for the matching expert 308.

The response module 528 can further update the request repository 320 based on sequencing, ordering, evaluating, or a combination thereof for the request 202 relative to other previous requests based on urgency. The response module 528 can update the request repository 320 based on sequencing, ordering, evaluating, or a combination thereof for the request 202 based on the time sensitivity 222. The response module 528 can update the request repository 320 according to urgency with the request 202 with short or immediate response as indicated by time sensitivity 222.

The response module 528 can generate the matching response 310 for the request 202. The response module 528 can generate the matching response 310 in a variety of ways. For example, the response module 528 can generate the matching response 310 including the projected response 312 of FIG. 3, the direct response 314 of FIG. 3, or a combination thereof.

The response module 528 can generate the matching response 310 including the projected response 312 based on estimating the projected response 312 using the member profile 228 of the matching expert 308. The response module 528 can generate the matching response 310 based on the member profile 228 corresponding to the matching expert 308 for estimating the matching response 310 likely to be provided by the matching expert 308. For example, the response module 528 can estimate the projected response 312 based on searching the member preference 232, the location history 234, the previous response 236, or a combination thereof for the subject matter 214, the regional-association 216, or a combination thereof.

As a more specific example, the response module 528 can estimate the projected response 312 as the location, the establishment, the good, the activity, or a combination thereof with map data or characteristic matching the subject matter 214, the regional-association 216, or a combination thereof. The response module 528 can further estimate the projected response 312 as the good, the activity, or a combination thereof favored or frequented by the matching expert 308 with similarity, match, or overlap in the member preference 232 and the user preference 210.

Also as a more specific example, the response module 528 can estimate the projected response 312 as the previous response 236 associated with the previous instance of the request 202 corresponding to the current instance of the request 202. The response module 528 can estimate the projected response 312 as the previous response 236 corresponding to the subject matter 214, the regional-association 216, or a combination thereof identical or similar to the current instance of the request 202.

The response module 528 can generate the matching response 310 including the direct response 314. The response module 528 can generate the matching response 310 for request 202 from the user 204 based on interacting or communicating with the matching expert 308. The response module 528 can interact or communicate with the matching expert 308 by communicating the request 202, such as visually or audibly.

For example, the response module 528 can communicate the request 202 between devices using one or more of the communication units as described above. The response module 528 can further communicate the request 202 to the matching expert 308 through one or more of the devices using one or more of the user interface as described above.

The response module 528 can generate the matching response 310 by capturing an input from or a status of the matching expert 308 subsequent to communicating the request 202. The response module 528 can capture the input or the responsive information from the matching expert 308 using one or more of the user interface as described above. The response module 528 can further communicate the matching response 310 received from the matching expert 308 between the devices as described above.

The response module 528 can further generate the matching response 310 by communicating the matching response 310 to the user 204 in response to the request 202. The response module 528 can communicate the matching response 310 between the devices corresponding to the matching expert 308 and the user 204. The response module 528 can further communicate the matching response 310 to the user 204 through the user interface of the user's device, such as the first device 102, the second device 106, other device, or a combination thereof.

The response module 528 can further generate the matching response 310 in a different way. For example, the response module 528 can communicate the request 202 to the members 226 before determining the matching expert 308. The response module 528 can communicate the matching response 310 based on receiving responses from the members 226 responding to the request 202. The response module 528 can generate the response set 316 of FIG. 3 as the response from the members 226 responding to the request 202.

Continuing with the example, the response module 528 can further generate the response set 316 including the ranking sequence 318 of FIG. 3 for arranging or evaluating the various responses from the members 226 in the response set 316. The response module 528 can determine the ranking sequence 318 based on identifying the matching expert 308 amongst the members 226 responding to the request 202. The response module 528 can generate the matching response 310 as the instance of the response in the response set 316 from the matching expert 308.

Continuing with the example, the response module 528 can further generate the matching response 310 based on arranging or evaluating the responses in the response set 316 for the ranking sequence 318. The response module 528 can arrange or evaluate for the ranking sequence 318 based on expertise of the member corresponding to the response, such as the subject expertise 246 or the regional expertise 248, based on similarity between the member preference 232 of the corresponding member and the user preference 210, or a combination thereof.

Continuing with the example, the response module 528 can determine the ranking sequence 318 based on degree of expertise corresponding to the subject matter 214, the regional-association 216, or a combination thereof for the request 202. The response module 528 can further determine the ranking sequence 318 based on degree of similarity between the member profile 228 and the user profile 206. The response module 528 can include a method, a process, an equation, or a combination thereof predetermined by the computing system 100 for determining the ranking sequence 318 based on the degree of expertise, the degree of similarity, or a combination thereof.

The response module 528 can generate the matching response 310 based on communicating one or more responses in the response set 316 from the matching member to the user 204. The response module 528 can further generate the matching response 310 based on communicating the response set 316 including the ranking sequence 318 to the user 204.

It has been discovered that determination of the matching expert 308 for the request 202 from amongst the members 226 provides optimal responses for crowd-sourced information. The request profile 210, the member profile 228, the user profile 206, or a combination thereof can be used to determine the member with similar preferences with the user 204, appropriate knowledge regarding the subject matter 214, the applicable location, the complexity level 220, or a combination thereof as the matching expert 308. The determination of the matching expert 308 can provide the matching response 310 best suited for addressing the request 202 specifically for the user 204.

It has been discovered that the subject matter 214 for the request 202 and the subject expertise 246 for the member profile 228 provide topic-specific responses appropriate for the request 202. The determination of the subject matter 214 and the subject expertise 246 can categorize the request 202 and the knowledge or experience of the members 226 into common categories. Comparison between the subject matter 214 and the subject expertise 246 can allow determination of the matching expert 308 that knows the topic of the request well enough to provide appropriate matching response 310.

It has been discovered that the regional-association 216 for the request 202 and the regional expertise 248 for the member profile 228 provide location-specific responses appropriate for the request 202. The determination of the regional-association 216 and the regional expertise 248 can map the request 202 and the knowledge or experience of the members 226 into geographic locations. Comparison between the regional-association 216 and the regional expertise 248 can allow determination of the matching expert 308 that knows the geographic area well enough to provide appropriate matching response 310.

It has been discovered that comparison between the user preference 210 and the member preference 232 provide preference-specific responses appropriate for the request 202. The comparison between the user preference 210 and the member preference 232 can identify the matching expert 308 with similar tastes and preferences as the user 204. The matching expert 308 can provide the matching response 310 that aligns with particularities of the user's preferences.

It has been discovered that the standardized rating 302 for the expertise or preference provides a common reference point for evaluating and comparing multiple people. The standardized rating 302 can be used to determine a norm or an average. The reference point can be used to increase the efficiency of the evaluation or the comparison process based on using the standardized rating 302 as a training set, a common origin or a reference point, or a combination thereof.

It has been discovered that the matching response 310 including the projected response 312 provides increased efficiency. The matching response 310 addressing the request 202 without direct interaction from the matching expert 308 can provide the matching response 310 without delays caused by the matching expert 308, while maximizing the benefits of determining the matching expert 308 best suited to address the request 202.

The matching module 506 can use the first control unit 412, the second control unit 434, other control unit of other device, or a combination thereof to determine the matching expert 308, the expert set 304, or a combination thereof. The matching module 506 can use the first user interface 418, the second user interface 438, other user interface for other device, the first communication unit 416, the second communication unit 436, other communication unit, or a combination thereof to communicate the request 202, the matching response 310, or a combination thereof between the user 204, the members 226, or a combination thereof. The matching module 506 can store the matching expert 308, the matching response 310, or a combination thereof in the first storage unit 414, the second storage unit 446, other storage unit for other device, or a combination thereof.

After enabling the interaction between the user 204 and the members 226 for addressing the request 202, the control flow can pass from the matching module 506 to the feedback module 508, the member analysis module 502, or a combination thereof. The control flow can pass similarly as described above between the member analysis module 502 and the submission module 504, but using processing results of the matching module 506, such as the matching expert 308, the matching response 310, or a combination thereof.

The member analysis module 502 can set the matching response 310 as the previous response 236 provided by the member determined as the matching expert 308 for the particular instance of the request 202. The member analysis module 502 can use the previous response 236 set from the matching response 310 to further determine, update, or adjust the member profile 228 as described above.

The feedback module 508 is configured to communicate feedback for the matching response 310. The feedback module 508 can communicate the requester feedback 322, the community feedback 324, or a combination thereof.

The feedback module 508 can communicate the community feedback 324 by availing the matching response 310, enabling access to the matching response 310, communicating the matching response 310 and the request 202, or a combination thereof to one or more of the members 226 other than the matching expert 308. The feedback module 508 can allow the members 226 to review or evaluate the matching response 310. The feedback module 508 can capture or receive the information representing the review or evaluation from the members 226 as the community feedback 324.

The feedback module 508 can communicate the requester feedback 322 by receiving an evaluation or a representation of appreciation from the user 204 for the matching response 310. The feedback module 508 can receive a message, a rating, a gift, or a combination thereof as the requester feedback 322. The feedback module 508 can further use the behavior of the user 204, such as utilizing the information of the matching response 310 or visiting the establishment described in the content of the matching response 310, as the requester feedback 322.

The feedback module 508 can further communicate the requester feedback 322 to the matching expert 308. The feedback module 508 can implement the requester feedback 322, such as for gifts or tokens of appreciation, for the benefit of the matching expert 308 as intended or designated by the user 204.

The feedback module 508 can use the first control unit 412, the second control unit 434, other control unit of other device, or a combination thereof to determine the feedback information. The feedback module 508 can use the first user interface 418, the second user interface 438, other user interface for other device, the first communication unit 416, the second communication unit 436, other communication unit, or a combination thereof to communicate the feedback information. The feedback module 508 can store the feedback information in the first storage unit 414, the second storage unit 446, other storage unit for other device, or a combination thereof.

After communicating the feedback information, the control flow can pass from the feedback module 508 to the member analysis module 502. The control flow can pass similarly as described above between the member analysis module 502 and the submission module 504, but using processing results of the feedback module 508, such as the requester feedback 322, the community feedback 324, or a combination thereof. The member analysis module 502 can use the requester feedback 322, the community feedback 324, or a combination thereof to determine, update, adjust or a combination thereof for the member profile 228 of the corresponding member.

It has been discovered that the requester feedback 322 and the community feedback 324 provides increased accuracy and integrity of the computing system 100. The requester feedback 322 and the community feedback 324 can provide self-policing for the members 226 to identify good and bad information or behavior. The self-policing can be provided through the use of the requester feedback 322, the community feedback 324, or a combination thereof in determining the expertise or preference of the corresponding member.

The modules described in this application can be hardware implementation or hardware accelerators, including passive circuitry, active circuitry, or both, in the first storage unit 414, the second storage unit 446, the first control unit 412, the second control unit 434, or a combination thereof. The modules can also be hardware implementation or hardware accelerators, including passive circuitry, active circuitry, or both, within the first device 102, the second device 106, or a combination thereof but outside of the first storage unit 414, the second storage unit 446, the first control unit 412, the second control unit 434, or a combination thereof.

The computing system 100 has been described with module functions or order as an example. The computing system 100 can partition the modules differently or order the modules differently. For example, the member analysis module 502 and the matching module 506 can be combined or the response module 528 and the feedback module 508 can be combined into one module. Also for example, the computing system 100 can include the member analysis module 502 between the submission module 504 and the matching module 506.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 414, the second storage unit 446, or a combination thereof can represent the non-transitory computer readable medium. The first storage unit 414, the second storage unit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the request 202 or the matching response 310 results in the movement in the physical world, such as content displayed or recreated for the user on one or more of the devices or physical displacement of the user 204 carrying the first device 102. Movement in the physical world results in updates to the behavior of the user 204, which can be fed back into the computing system 100 and further influence the member profile 228 including the expertise or the preference of corresponding members or user.

Figure 6:
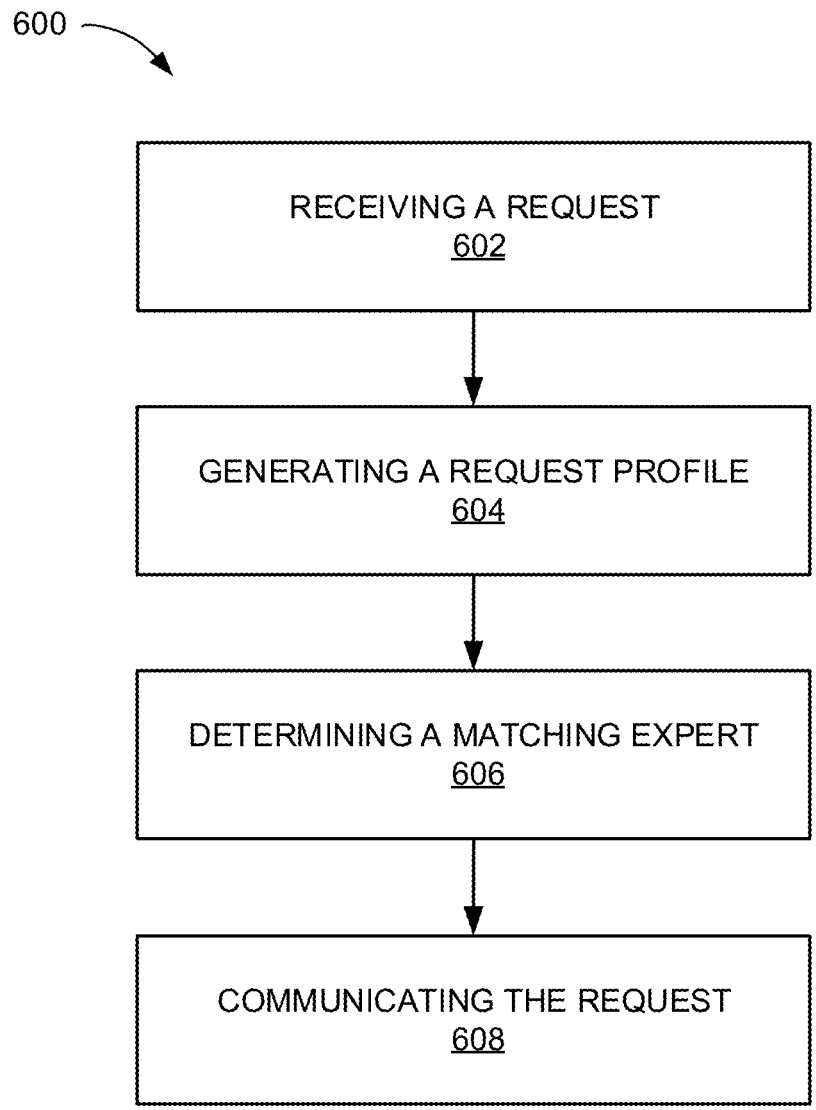
FIG. 6 is a flow chart of a method of operation of a computing system in an embodiment of the present invention.

Referring now to FIG. 6, therein is shown a flow chart of a method 600 of operation of a computing system 100 in an embodiment of the present invention. The method 600 includes: receiving a request for representing the request from a user in a block 602; generating a request profile based on the request for processing the request in a block 604; determining a matching expert with a control unit for the request based on the request profile and based on member profiles for representing members in a block 606; and communicating the request for the matching expert in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a computing system comprising:
    receiving a request for representing the request from a user;
    generating a request profile based on the request for processing the request;
    determining a matching expert with a control unit for the request based on the request profile and based on regional expertise of member profiles for representing members, wherein the regional expertise is determined based on details regarding a visit by the members to a geographic area associated with the request, including a length of time spent at the geographic area; and
    communicating the request for the matching expert.

2. The method as claimed in claim 1 further comprising:
    determining the member profiles each including subject expertise, the regional expertise, or a combination thereof for representing each of the members;
    wherein:
    generating the request profile includes generating the request profile including a subject matter, a regional-association, or a combination thereof for describing the request; and
    determining the matching expert includes determining the matching expert based on the subject expertise, the regional expertise, or a combination thereof corresponding to the subject matter, the regional-association, or a combination thereof.

3. The method as claimed in claim 1 further comprising:
    determining a user preference for representing the user asking the request;
    determining the member profiles each including a member preference for representing each of the members; and
    wherein:
    determining the matching expert includes determining the matching expert based on matching the member preference with the user preference.

4. The method as claimed in claim 1 further comprising:
    determining a standardized rating; and
    determining the member profiles each including a member preference for representing each of the members;
    wherein:
    determining the matching expert includes determining the matching expert based on comparing the standardized rating with the member preference.

5. The method as claimed in claim 1 wherein determining the matching expert includes determining the matching expert based on location history, previous response, response category, previous delay, requester feedback, community feedback, or a combination thereof.

6. The method as claimed in claim 1 further comprising communicating a matching response associated with the matching expert in response to the request.

7. The method as claimed in claim 6 further comprising generating the matching response based on the instance of the member profiles corresponding to the matching expert for estimating the matching response likely to be provided by the matching expert.

8. The method as claimed in claim 6 wherein:
    generating the request profile includes calculating time sensitivity for the request;
    communicating the request includes updating a request repository with the request based on the time sensitivity.

9. The method as claimed in claim 6 wherein:
    communicating the request includes communicating the request for requesting the members to answer the request; and
    communicating the matching response includes generating a response set including a ranking sequence for arranging instances of the matching response from the members based on subject expertise, the regional expertise, or a combination thereof the members.

10. The method as claimed in claim 6 further comprising communicating a requester feedback in response to the matching response.

11. A computing system comprising:
    a communication unit configured to communicate a request for representing the request from a user or for a matching expert;
    a control unit, coupled to the communication unit, configured to:
        generate a request profile based on the request for processing the request, and determining the matching expert for the request based on the request profile and based on regional expertise of member profiles for representing members, for communicating the request to the matching expert, wherein the regional expertise is determined based on details regarding a visit by the members to a geographic area associated with the request, including a length of time spent at the geographic area.

12. The system as claimed in claim 11 wherein the control unit is configured to:
determine the member profiles each including subject expertise, the regional expertise, or a combination thereof for representing each of the members;
generate the request profile including a subject matter, a regional-association, or a combination thereof for describing the request; and
determine the matching expert based on the subject expertise, the regional expertise, or a combination thereof corresponding to the subject matter, the regional-association, or a combination thereof.

13. The system as claimed in claim 11 wherein the control unit is configured to:
determine a user preference for representing the user asking the request;
determine the member profiles each including a member preference for representing each of the members; and
determine the matching expert based on matching the member preference with the user preference.

14. The system as claimed in claim 11 wherein the control unit is configured to:
determine a standardized rating;
determine the member profiles each including a member preference for representing each of the members; and
determine the matching expert based on comparing a standardized rating with the member preference.

15. The system as claimed in claim 11 wherein the control unit is configured to determine the matching expert based on location history, previous response, response category, previous delay, requester feedback, community feedback, or a combination thereof.

16. A non-transitory computer readable medium including instructions for a computing system comprising:
receiving a request for representing the request from a user;
generating a request profile based on the request for processing the request;
determining a matching expert for the request based on the request profile and based on regional expertise of member profiles for representing members, wherein the regional expertise is determined based on details regarding a visit by the members to a geographic area associated with the request, including a length of time spent at the geographic area; and
communicating the request for the matching expert.

17. The non-transitory computer readable medium as claimed in claim 16 wherein:
determining the member profiles includes determining the member profiles each including subject expertise, the regional expertise, or a combination thereof for representing each of the members;
generating the request profile includes generating the request profile including a subject matter, a regional-association, or a combination thereof for describing the request; and
determining the matching expert includes determining the matching expert based on the subject expertise, the regional expertise, or a combination thereof corresponding to the subject matter, the regional-association, or a combination thereof.

18. The non-transitory computer readable medium as claimed in claim 16 further comprising:
determining a user preference for representing the user asking the request;
wherein:
determining the member profiles includes determining the member profiles each including a member preference for representing each of the members; and
determining the matching expert includes determining the matching expert based on matching the member preference with the user preference.

19. The non-transitory computer readable medium as claimed in claim 16 further comprising:
determining a standardized rating;
wherein:
determining the member profiles includes determining the member profiles each including a member preference for representing each of the members; and
determining the matching expert includes determining the matching expert based on comparing a standardized rating with the member preference.

20. The non-transitory computer readable medium as claimed in claim 16 wherein determining the matching expert includes determining the matching expert based on location history, previous response, response category, previous delay, requester feedback, community feedback, or a combination thereof.

* * * * *